(12) United States Patent
Sasaki et al.

(10) Patent No.: US 11,812,201 B2
(45) Date of Patent: Nov. 7, 2023

(54) LIGHT GUIDE OPTICAL DEVICE, LIGHT SOURCE DEVICE, AND IMAGE PROJECTION APPARATUS

(71) Applicants: Takashi Sasaki, Kanagawa (JP); Yohei Takano, Kanagawa (JP); Kasumi Nakamura, Kanagawa (JP); Kazuhiro Fujita, Tokyo (JP); Makoto Hirakawa, Tokyo (JP); Shigeaki Imai, Kanagawa (JP)

(72) Inventors: Takashi Sasaki, Kanagawa (JP); Yohei Takano, Kanagawa (JP); Kasumi Nakamura, Kanagawa (JP); Kazuhiro Fujita, Tokyo (JP); Makoto Hirakawa, Tokyo (JP); Shigeaki Imai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/724,514

(22) Filed: Apr. 20, 2022

(65) Prior Publication Data
US 2022/0345671 A1    Oct. 27, 2022

(30) Foreign Application Priority Data

Apr. 23, 2021   (JP) ................. 2021-073662

(51) Int. Cl.
*G02B 27/09*   (2006.01)
*G02B 27/10*   (2006.01)
(Continued)

(52) U.S. Cl.
CPC .......... *H04N 9/317* (2013.01); *G02B 6/0096* (2013.01); *G02B 27/0994* (2013.01);
(Continued)

(58) Field of Classification Search
CPC .. G02B 6/0096; G02B 27/10; G02B 27/0096; G03B 21/2013; G03B 21/204; G03B 21/2066
(Continued)

(56) References Cited

U.S. PATENT DOCUMENTS

2004/0021831 A1    2/2004 Koide
2016/0085143 A1    3/2016 Hu et al.
(Continued)

FOREIGN PATENT DOCUMENTS

CN      1693986 A     11/2005
CN    101598298 A     12/2009
(Continued)

OTHER PUBLICATIONS

KR 20160008543 (Year: 2023).*
(Continued)

*Primary Examiner* — Jerry L Brooks
(74) *Attorney, Agent, or Firm* — XSENSUS LLP

(57) ABSTRACT

A light guide optical device includes an optical path combiner including: a first deflector to deflect first light incident from a first direction to an emission direction; a second deflector to deflect second light incident from a second direction different from the first direction, to the emission direction; and a transmission portion between the first deflector and the second deflector, the transmission portion to transmit third light incident from a third direction different from each of the first direction and the second direction, to the emission direction. The optical path combining unit combines the first light, the second light, and the third light, and emits the combined light to the mission direction.

20 Claims, 16 Drawing Sheets

(51) Int. Cl.
 *G03B 21/20* (2006.01)
 *H04N 9/31* (2006.01)
 *F21V 8/00* (2006.01)

(52) U.S. Cl.
 CPC .......... *G02B 27/10* (2013.01); *G03B 21/204* (2013.01); *G03B 21/2013* (2013.01); *G03B 21/2066* (2013.01)

(58) Field of Classification Search
 USPC ........................................................ 353/618
 See application file for complete search history.

(56) References Cited

U.S. PATENT DOCUMENTS

| | | |
|---|---|---|
| 2020/0301260 A1 | 9/2020 | Takano et al. |
| 2020/0301266 A1 | 9/2020 | Nakamura et al. |
| 2020/0319541 A1 | 10/2020 | Tanaka |
| 2021/0136336 A1 | 5/2021 | Takano et al. |
| 2021/0173290 A1 | 6/2021 | Takano et al. |
| 2021/0200075 A1 | 7/2021 | Nakamura et al. |
| 2022/0066177 A1 | 3/2022 | Takano et al. |

FOREIGN PATENT DOCUMENTS

| | | | | |
|---|---|---|---|---|
| CN | 201780448 U | | 3/2011 | |
| CN | 103261964 A | | 8/2013 | |
| CN | 111624842 A | | 9/2020 | |
| CN | 112540499 A | | 3/2021 | |
| JP | 2006-010741 | | 1/2006 | |
| JP | 2014-160233 | | 9/2014 | |
| JP | 2017-111287 | | 6/2017 | |
| KR | 20160008543 | * | 1/2016 | ......... G02B 27/1013 |
| WO | 2018/142589 A1 | | 11/2019 | |

OTHER PUBLICATIONS

U.S. Appl. No. 17/539,204, filed Dec. 1, 2021, Kazuhiro Fujita, et al.
U.S. Appl. No. 17/509,106, filed Oct. 25, 2021, Yohei Takano, et al.
U.S. Appl. No. 17/671,590, filed Feb. 15, 2022, Kazuhiro Fujita, et al.
Office Action dated Jun. 27, 2023 in Chinese Patent Application No. 202210391780.1.

\* cited by examiner

LIGHT GUIDE OPTICAL DEVICE, LIGHT SOURCE DEVICE, AND IMAGE PROJECTION APPARATUS

CROSS-REFERENCE TO RELATED APPLICATIONS

This patent application is based on and claims priority pursuant to 35 U.S.C. § 119(a) to Japanese Patent Application No. 2021-073662, filed on Apr. 23, 2021, in the Japan Patent Office, the entire disclosure of which is hereby incorporated by reference herein.

BACKGROUND

Technical Field

Embodiments of the present disclosure relates to a light guide optical device, a light source device, and an image projection apparatus.

Related Art

In terms of resolution of the projector (image projection apparatus), even in a large-sized projector, a full high definition (HD) resolution is current mainstream. However, a resolution of 4K is expected to become widely available in the future. In addition, a projector having 8K resolution has already been technically studied. Thus, there is a demand for a larger-sized screen of a projector and a higher brightness of an illumination optical system associated with the larger-sized screen in the future.

Under such a circumstance, the technique of combining blue laser light and fluorescent light emitted from a phosphor using the bole laser light as excitation light to further increase brightness of a projector is known.

SUMMARY

A light guide optical device includes an optical path combiner including: a first deflector to deflect first light incident from a first direction to an emission direction; a second deflector to deflect second light incident from a second direction different from the first direction, to the emission direction; and a transmission portion between the first deflector and the second deflector, the transmission portion to transmit third light incident from a third direction different from each of the first direction and the second direction, to the emission direction. The optical path combining unit combines the first light, the second light, and the third light, and emits the combined light to the mission direction.

A light source device includes: the light guide optical device; a first light source to emit the first light; a second light source to emit the second light; and a third light source to emit the third light. The light guide optical device forms at least one of a conjugate image of the first light source, a conjugate image of the second light source, and a conjugate image of the third light source, in the optical path combiner.

An image projection apparatus includes; an illumination optical system including the light source device; a spatial light modulator to receive light emitted from the illumination optical system and emit image light; and a projection optical system to project the image light on an object.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
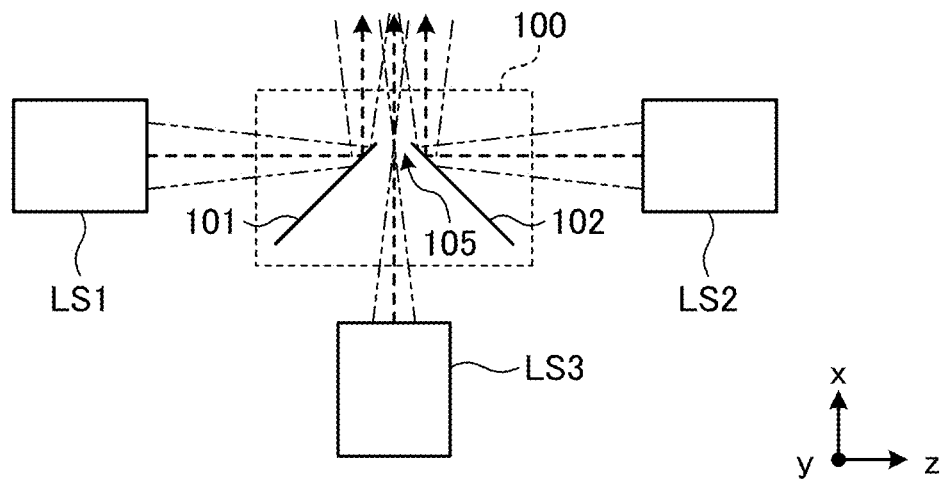
FIG. 1 is an illustration of one embodiment of a light guide optical device and an optical path combiner.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

According to embodiments of the present invention, light beams from three or more light sources are combined with high efficiency.

Hereinafter, embodiments of a light guide optical device, a light source device, and an image projection apparatus are described in detail with reference to the accompanying drawings. Hereinafter, an x-axis, a y-axis, and a z-axis are based on arrows (i.e., coordination system) illustrated in the drawings. Hereinafter, the x-axis, the y-axis, and the z-axis are orthogonal to each other in a three-dimensional space (i.e., the Cartesian coordinate system or the rectangular coordinate system). A positive direction of each axis is indicated by an arrow, and a positive side of each axis is a position located along the positive direction of the axis from the origin of the coordinate system, and a negative direction and a negative side of each axis are the opposite.

Figure 2:
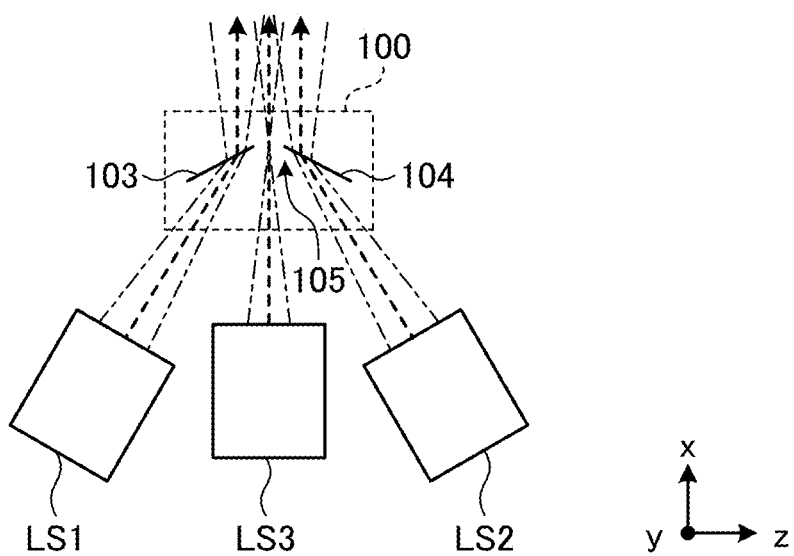
FIG. 2 is an illustration of another embodiment of a light guide optical device and an optical path combiner.
Figure 3:
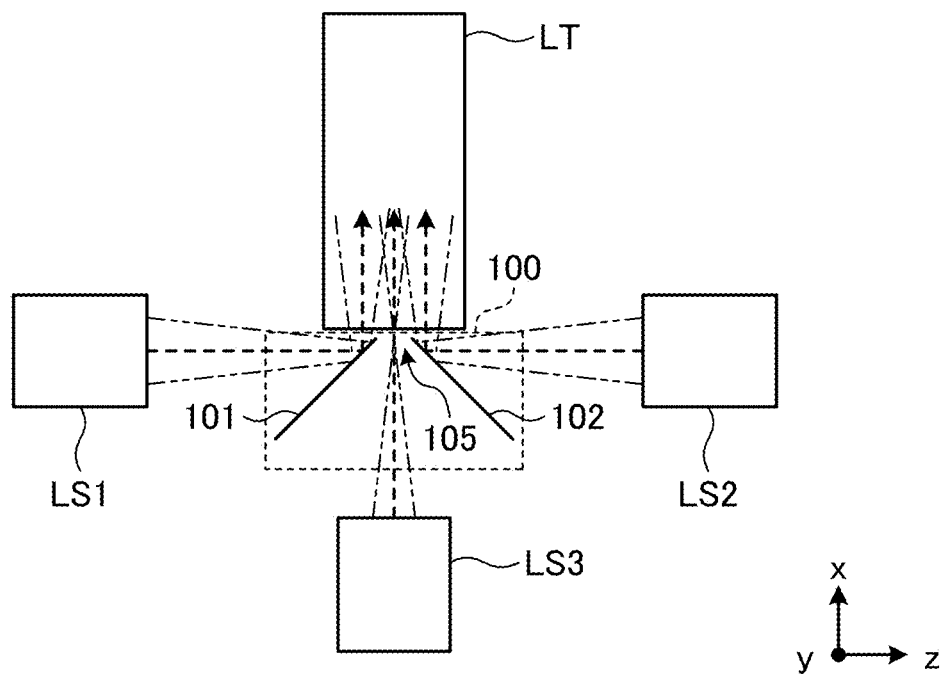
FIG. 3 is an illustration of yet another embodiment of a light guide optical device and an optical path combiner.

FIGS. 1 to 3 are illustrations of a light guide optical device and an optical path combiner according to the present embodiment. As illustrated in FIGS. 1 and 2, the light guide optical device according to the present embodiment includes an optical path combiner 100. As illustrated in FIG. 3, the light source device according to the present embodiment includes light sources LS1 to LS3, an optical path combiner 100, and a light tunnel LT (i.e., light homogenizer). In the description below, the light sources SL1 to SL3 may be described as the light source LS when the light sources SL1 to SL3 are not distinguished from each other.

The light sources LS1 to LS3 are examples of light sources that emit light. Specifically, the light source LS1 is an example of a first light source that emits light (i.e., first light) in the positive direction of the z-axis. The light source LS2 is an example of a second light source that emits light (i.e., second light) in the negative direction of the z-axis. The light source LS3 is an example of a third light source that emits light (i.e., third light) in the positive direction of the x-axis. In the present embodiment, the light source LS3 preferably emits light that linearly propagates in the positive direction of the x-axis (i.e., an emission direction).

Accordingly, light loss caused by deflecting the light emitted from the light source LS3 in the emission direction is reduced. In addition, since an effective region through which the light emitted from the light source LS3 passes in the optical path combiner 100 is reduced, the light guide optical device is miniaturized.

In the present embodiment, the light source LS3 is preferably a laser light source that emits laser light. Accordingly, since the light emitted from the light source LS3 converges sharply in the optical path combiner 100, the light loss is reduced.

The optical path combiner 100 is an example of an optical path combiner that combines the light incident from three different directions (i.e., combined light) and emits the combined light in the positive direction of the x-axis (i.e., an emission direction). For example, the optical path combiner 100 includes reflection surfaces 101 and 102 and a transmission portion 105 as illustrated in FIG. 1.

The reflection surface 101 is an example of a first deflector that reflects the light incident from the light source LS1 (i.e., first light) in the positive direction of the x-axis. In other words, the first light is incident from the negative side of the z-axis and is emitted to the positive side of the x-axis. The reflection surface 102 is an example of a second deflector that reflects the light incident from the light source LS2 (i.e., second light) to the positive side of the x-axis. In other words, the second light is the light incident from the positive side of the z-axis and is emitted to the positive side of the x-axis.

The transmission portion 105 is an example of a transmission portion that transmits the light incident from the negative side of the x-axis to the positive side of the x-axis. The transmission portion 105 is between the reflection surface 101 and the reflection surface 102. A first light-condensed portion at the reflection surface 101, in which the first light emitted from the light source LS1 is condensed, a second light-condensed portion at the reflection surface 102, in which the second light emitted from the light source LS2 is condensed, and a third light-condensed portion at the transmission portion 105, in which the third light emitted from the light source LS3 is condensed, do not coincide with each other. Accordingly, the third light-condensed portion at the transmission portion 105 is not shaded by the reflection surface 101 and the reflection surface 102. In other words, the third light is not partly blocked by the reflection surface 101 and the reflection surface 102. As a result, the light from three or more light sources LS is combined with high efficiency.

In the present embodiment, the light guide optical device forms conjugate images of the light sources LS1 to LS3 in the optical path combiner 100 by condensing the light emitted from the light sources LS1 to LS3. Accordingly, an effective region in which light deflects in the optical path combiner 100 is reduced, and the light source device is miniaturized.

Figure 4:
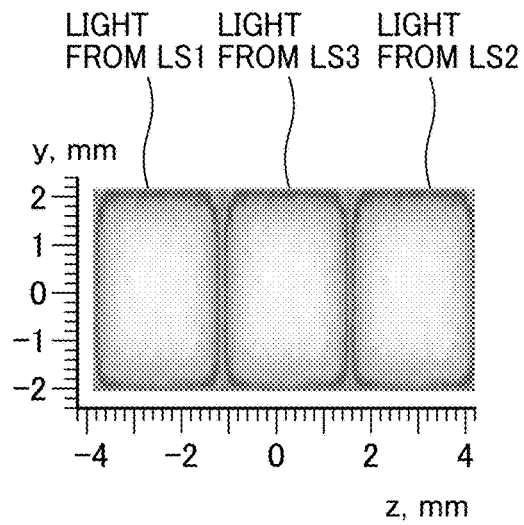
FIG. 4 is an illustration of an intensity distribution of light irradiated at an entrance of a light tunnel in a light source device according to one embodiment.

Preferably, in this case, the conjugate images of the light sources LS1 to LS3 formed in the optical path combiner 100 are arranged in a line when viewed from the positive side of the x-axis (i.e., the emission side) in FIG. 4. Accordingly, the effective region of the optical path combiner 100 is further reduced, and light source device is also further miniaturized.

Herein, the conjugate image is a light-condensed portion on which the light emitted from the light source LS is condensed. When the light source LS is a laser light source, the conjugate image is a condensing portion on which light emitted from the laser light source is condensed. In addition, when the light source LS includes an excitation light source and a wavelength converter, the conjugate image is a light-condensed portion in which light emitted from the wavelength converter is condensed.

Preferably, the conjugate image of the light source LS3 is formed in the vicinity of the transmission portion 105. Preferably, the conjugate image of the light source LS1 and the conjugate image of the light source LS2 are formed in the vicinity of the reflection surface 101 and the reflection surface LS2, respectively. Preferably, a portion of the conjugate image of the light source LS1 and a portion of the conjugate image of the light source LS2 are formed on the reflection surface 101 and the reflection surface 102, respectively. Accordingly, the effective region of the optical path combiner 100 is further reduced, and light source device is also further miniaturized.

Preferably, a conjugate image of the light source LS3 is formed between the conjugate image of the light source LS1 and the conjugate image of the light source LS2. Accordingly, since the optical path combiner 100 is arranged symmetrically when viewed from the emission direction, and a layout of the light source device is miniaturized.

In the light guide optical device of the present embodiment, three conjugate images of the light sources LS1 to LS3 are formed in the optical path combiner 100. But at least one conjugate image of the conjugate images of the light sources LS1 to LS3 may be formed in the optical path combiner 100. In addition, in the present embodiment, the light emitted from the light sources LS1 to LS3 is convergent toward the optical path combiner 100 (i.e., convergent light). But the light is not limited to the convergent light. The light may be parallel or divergent toward the optical path combiner 100.

The optical path combiner 100 illustrated in FIG. 1 uses the reflection surfaces 101 and 102 as an example of a deflector that deflects the light incident from the light sources LS1 and LS2 in the emission direction. However, as long as the light incident from the light sources LS1 and LS2 is deflected in the emission direction, the optical path combiner 100 is not limited thereto. For example, as illustrated in FIG. 2, the optical path combiner 100 may include refraction surfaces 103 and 104 as a deflector that deflects the light incident from the light sources LS1 and LS2 in the emission direction.

As illustrated in FIG. 2, the refraction surface 103 is an example of a first deflector that refracts (i.e., deflects) the light incident from the light source LS1 (i.e. first light). In other words, the refraction surface refracts (i.e., deflects) the light incident from the negative side of the z-axis to the positive side of the x-axis (i.e., the emission direction). The refraction surface 104 is an example of a second deflector that refracts (i.e., deflects) the light incident from the light source LS2 (i.e., second light). In other words, the refraction surface 104 refracts (i.e., deflects) the light incident from the positive side of the z-axis to the positive side of the x-axis.

In the present embodiments, the reflection surfaces 101 and 102 or the refraction surfaces 103 and 104 are used as the first deflector and the second deflector as an example. A combination of the reflection surface and the refraction surface may be used. For example, the reflection surface 101 may be used as a first deflector, and the refraction surface 104 may be used as a second deflector.

As illustrated in FIG. 3, the light tunnel LT is provided in a subsequent stage of the optical path combiner 100 in the optical path of the light emitted from the light sources LS1 to LS3. The light tunnel LT is an example of a light homogenizer that guides the light emitted from the optical path combiner 100 and emits the homogenized light. In the present embodiment, the light tunnel LT may be a light guide inside of which multiple reflection surfaces are bonded together, or a glass rod that guides light using the total internal reflection.

Figure 5:
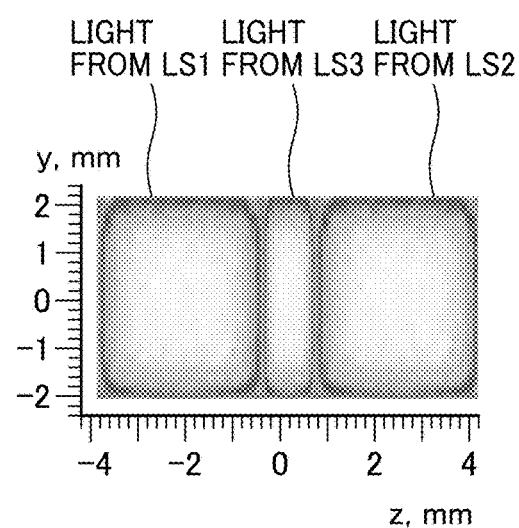
FIG. 5 is an illustration of an intensity distribution of light emitted at an entrance of the light tunnel in a light source device according to another embodiment.

FIGS. 4 and 5 are illustrations of examples of an intensity distribution of light emitted to the entrance of the light tunnel in the light source device according to the present embodiment. As illustrated in FIG. 4, in the present embodiment, three intensity distributions of the light of the three light sources LS1 to LS3 incident at the entrance of the light tunnel LT are the same. However, the intensity distributions of the light of the three light sources LS1 to LS3 may not have the same intensity distribution, size, or shape.

For example, as illustrated in FIG. 5, in the intensity distributions of light of the three light sources LS1 to LS3 incident at the entrance of the light tunnel LT, the intensity distribution of the light of the light source LS3 may be smaller than the intensity distributions of the light of the light sources LS1 and LS2. Among the conjugate images of the light sources LS1 to LS3 formed in the optical path combiner 100, the conjugate image of the light source LS3 may be smaller than the conjugate images of the light sources LS1 and LS2.

In the present embodiment, the conjugate image of each of the light sources LS1 to LS3 formed at the optical path combiner 100 has a shape elongated in one direction (e.g., a rectangle or an ellipse) on the image plane, as illustrated in FIGS. 4 and 5. In the present embodiment, the three conjugate images of the light sources LS1 to LS3 have a shape elongated in one direction. However, at least one conjugate image of the light sources LS1 to LS3 may have a shape elongated in one direction.

Figure 6:
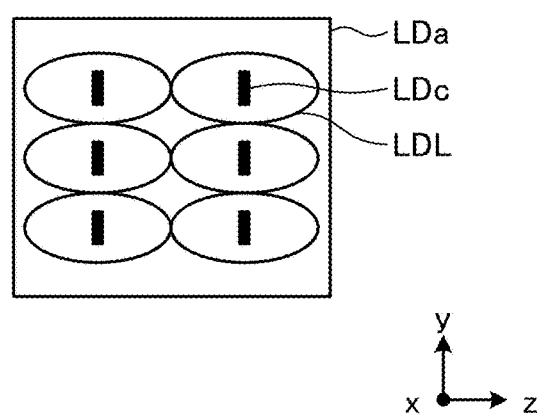
FIG. 6 is an illustration of a configuration of the light guide optical device according to one embodiment.
Figure 7:
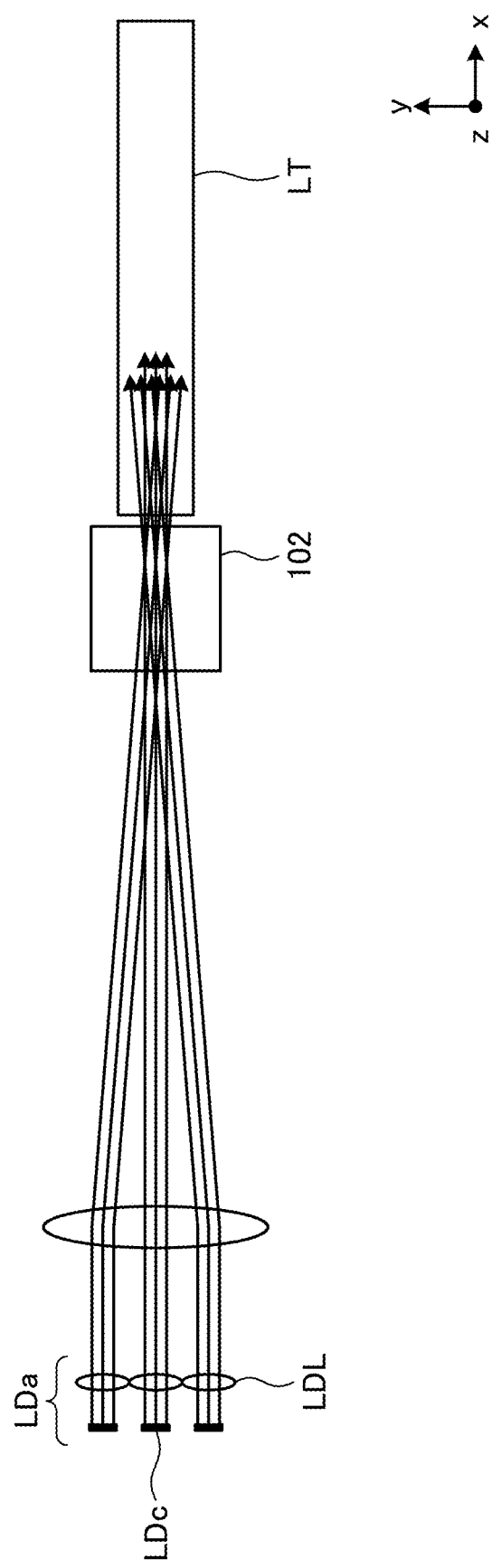
FIG. 7 is an illustration of a configuration of the light guide optical device according to another embodiment.
Figure 8:
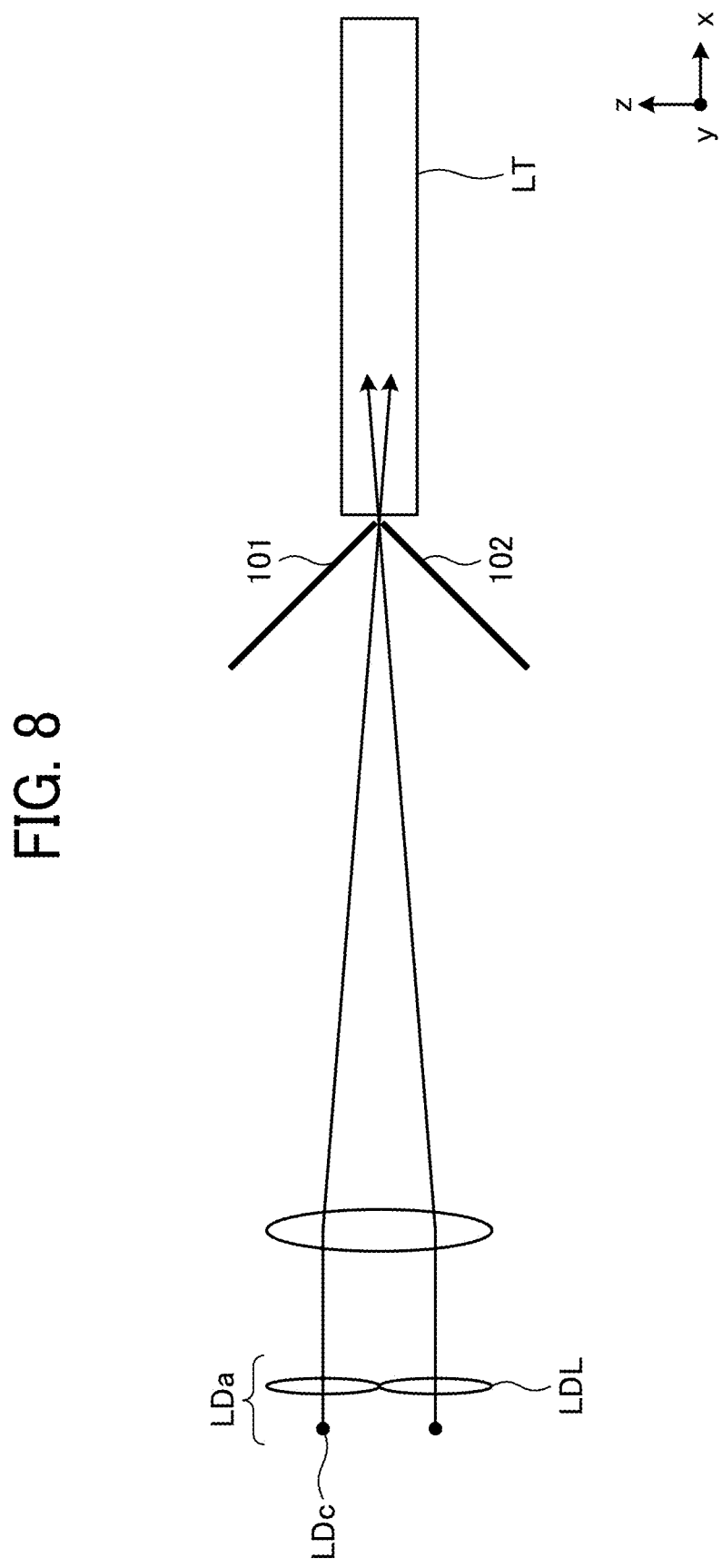
FIG. 8 is an illustration of a configuration of the light guide optical device according to yet another embodiment.

FIGS. 6 to 8 are illustrations of a configuration of the light guide optical device according to the present embodiment. In the present embodiment, as illustrated in FIGS. 6 to 8, at least one of the light sources LS1 to LS3 (e.g., the light source LS3) may be a semiconductor laser array LDa (i.e., a laser light source). As illustrated in FIGS. 6 to 8, the semiconductor laser array LDa includes a light emitter LDc that emits laser light and a lens LDL provided for each of the light emitter LDc.

As illustrated in FIGS. 7 and 8, preferably, the longitudinal direction of the light emitter LDc of the semiconductor laser array LDa and the longitudinal direction of the transmission portion 105 included in the optical path combiner 100 coincide with each other. In the present embodiment, the light emitter LDc has a rectangular shape, and is disposed such that the longitudinal direction of the rectangular shape coincides with the longitudinal direction of the transmission portion 105 between the reflection surfaces 101 and 102.

In the present embodiment, the light source device includes a single semiconductor laser array LDa or multiple semiconductor laser arrays LDa. The wavelengths of the laser beams emitted from multiple semiconductor laser arrays LDa may be the same or different from each other.

In the examples illustrated in FIGS. 6 to 8, the light source LS3 includes the semiconductor laser array LDa. At least one of the light sources LS1 to LS3 may be a laser light source such as the semiconductor laser array LDa. In this case, preferably, the longitudinal direction of the light emitter LDc of the semiconductor laser array LDa coincide with the longitudinal direction of any one of the first deflector, the second deflector, and the transmission portion on which the light is incident from the semiconductor laser array LDa.

Figure 9:
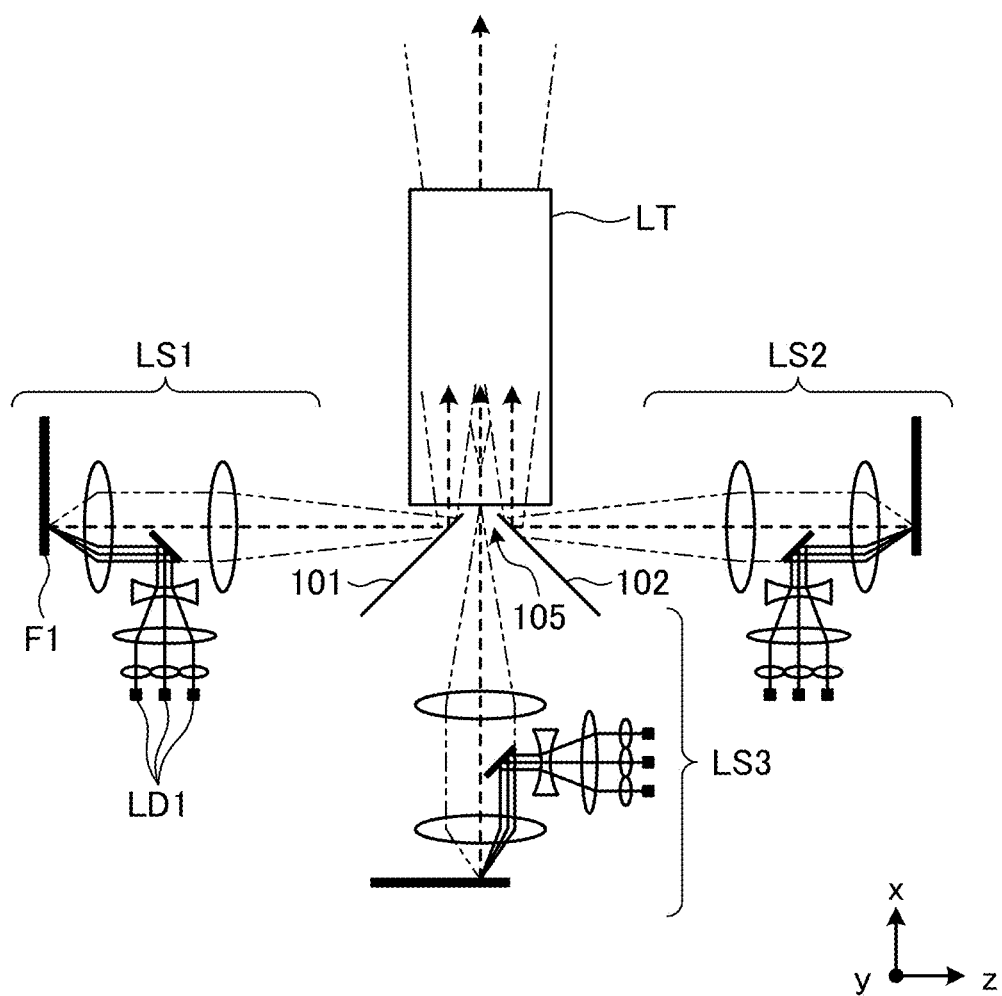
FIG. 9 is an illustration of a light source in the light guide optical device according to one embodiment.

FIG. 9 is an illustration of a light source in the light guide optical device according to the present embodiment. In the present embodiment, since the light sources LS1 to LS3 have an equivalent configuration, a configuration of the light source LS1 is described as an example.

In the present embodiment, the light source LS1 includes an excitation light source LD1 and a wavelength-converter F1. The excitation light source LD1 is an example of an excitation light source that emits excitation light. The excitation light source LD1 is a light source such as a semiconductor laser, and may have a laser array. The light source LS1 includes a light guide that guides the excitation light emitted from the excitation light source LD1 to the wavelength-converter F1.

The wavelength-converter F1 is, for example, a phosphor, and is excited by the excitation light emitted from the excitation light source LD1, and emits light (i.e., fluorescent light) having a wavelength band wider than a wavelength band of the excitation light source LD1. The wavelength-converter F1 is an example of a wavelength converter that converts the excitation light incident from the excitation light source LD1 into the light having a different wavelength band (i.e. converted light) and emits the converted light. Further, the light source LS1 includes a light condensing means (e.g., condenser lens) that condenses the light emitted from the wavelength-converter F1 and the light of the excitation light source F1 reflected by the wavelength-converter LD1 on the reflection surface 101.

The light emitted from the light source LS1 to condense on the reflection surface 101 is reflected by the reflection surface 101 in the positive direction of the x-axis, and enters the light tunnel LT. As described above, the light tunnel LT may be a light guide in which multiple reflection surfaces are bonded, or a glass rod that guides light using total internal reflection.

The light emitted from the light source LS2 is reflected by the reflection surface 102 in the positive direction of the x-axis and enters the light tunnel LT. The light emitted from the light source LS3 passes through the transmission portion 105 between the reflection surface 101 and the reflection surface 102 and directly enters the light tunnel LT. With the configuration described above, the light emitted the light sources LS1 to LS3 from three directions is combined.

Figure 10:
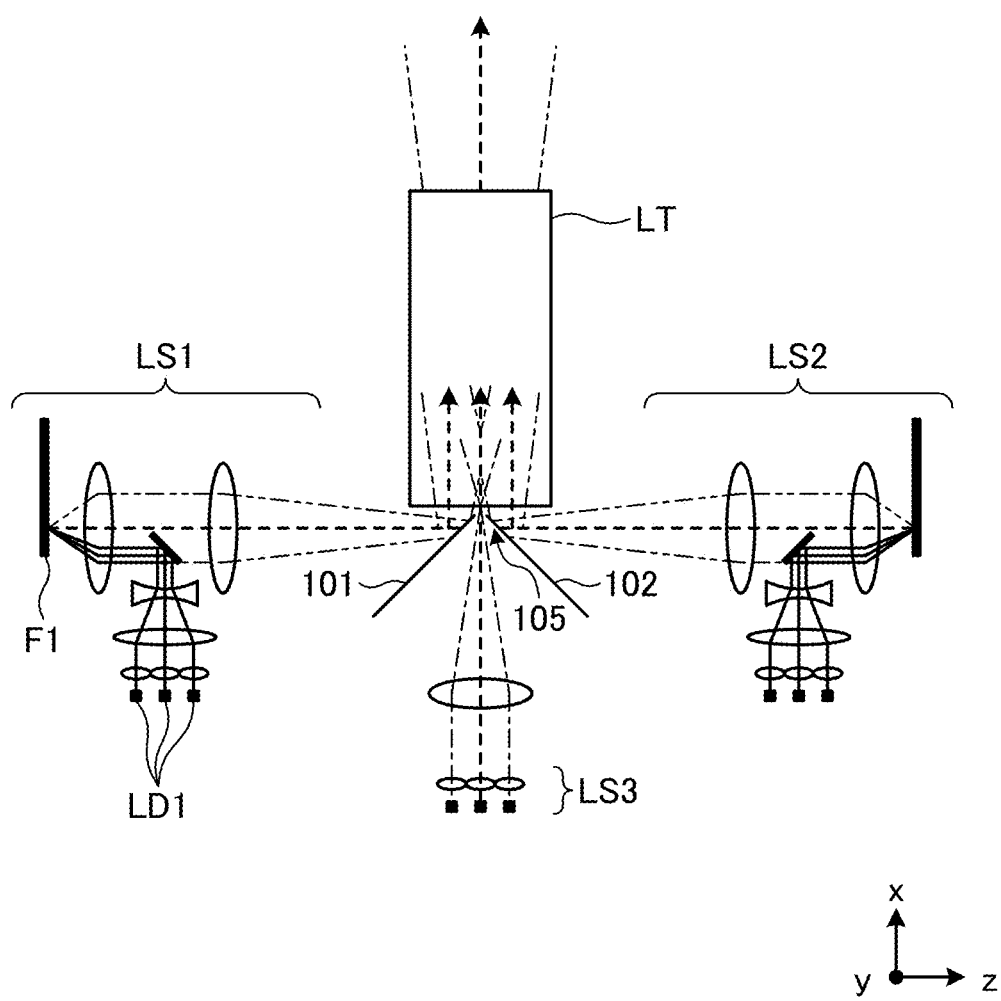
FIG. 10 is an illustration of a light source in the light guide optical device according to another embodiment.
Figure 11:
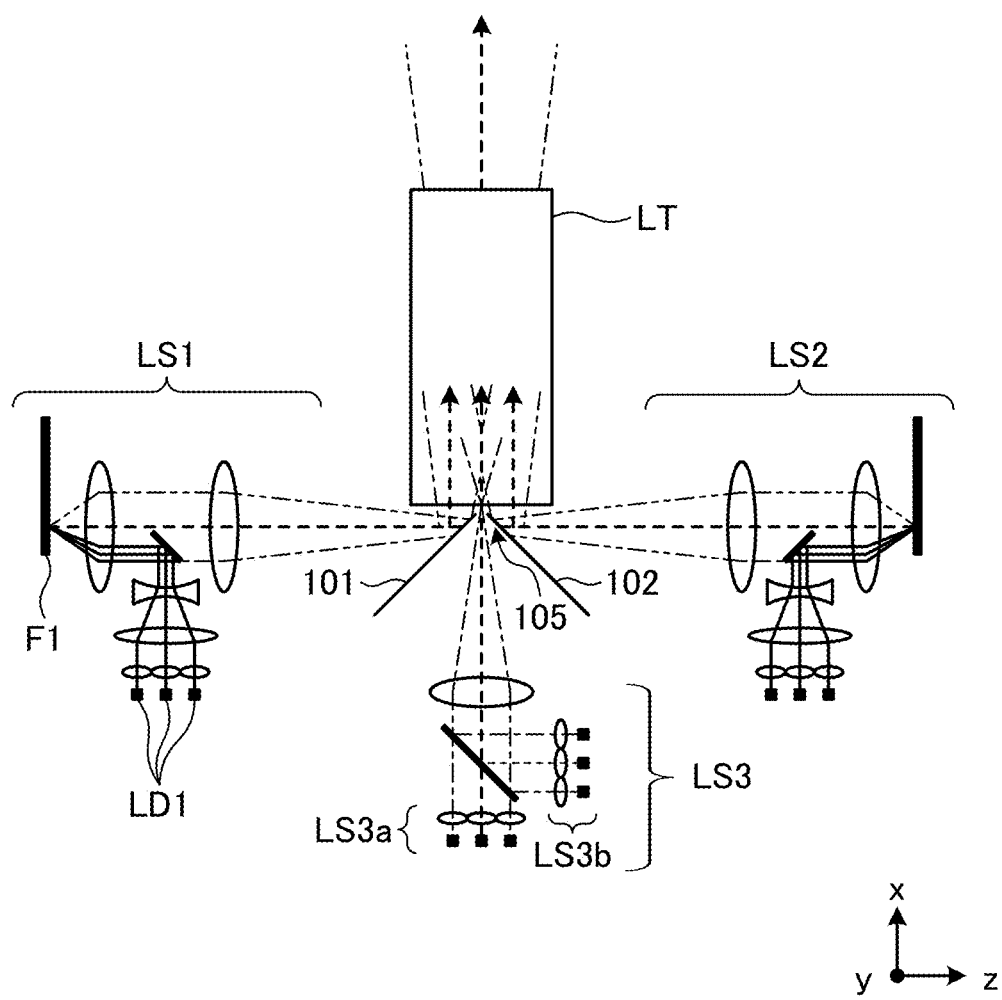
FIG. 11 is an illustration of a light source in the light guide optical device according to yet another embodiment.

FIGS. 10 and 11 are illustrations of other examples of the light source in the light guide optical device according to the present embodiment. In the present embodiment, at least one of the light source LS1, the light source LS2, and the light source LS3 includes the excitation light source and the wavelength-converter, and at least one of a remainder of the at least one of the light source LS1 the light source LS2, and the light source LS3 may emit light having a wavelength band narrower than a wavelength band of the excitation light source and the wavelength-converter.

Herein, as illustrated in FIG. 10, the light source device according to the present embodiment includes the light source LS1, the light source LS2, and the light source LS3, in which the light sources LS2 and LS3 are equivalent to the light source LS1. The configuration of the light source LS1 illustrated in FIG. 10 is similar to that of the light source LS1 illustrated in FIG. 9. The light source LS3 is a light source that emits light having a wavelength band narrower than a wavelength band of the light emitted from source LS1. The light source LS3 may be, for example, a semiconductor laser, a single light-emitter, or a light source having an array of light emitters. As illustrated in FIG. 10, the light emitted from the light source LS3 is condensed by the condenser lens, passes through the transmission portion 105 between the reflection surface 101 and the reflection surface 102, and enters the light tunnel LT. Accordingly, the light emitted from the light sources LS1 to LS3 is combined.

As illustrated in FIG. 11, the light source LS3 may include multiple light sources of LS3a and LS3b that emit light having a wavelength band narrower than the wavelength band of the light emitted from the light source LS1. The light emitted from each of the light sources LS3a and LS3b may have the same wavelength or different wavelengths, and may be provided with a single light emitter or an array of light emitters.

When the light emitted from the light source LS3a and the light emitted from the light source LS3b have the same wavelength, the light source device polarizes the light emitted from the light sources LS3a and LS3b and combines the light emitted from the light sources LS3a and LS3b by using a polarizing beam splitter (PBS) that transmits the light emitted from the light source LS3a and reflects the light emitted from the light source LS3b.

When the light emitted from the light source LS3a and the light emitted from the light source LS3b have different wavelengths, the light source device combines the light emitted from the light sources LS3a and LS3b by using a dichroic mirror that transmits the light emitted from the light source LS3a and reflects the light emitted from the light source LS3b.

In the light source device, the condenser lens causes the light emitted from the light sources LS3a and LS3b to enter the light tunnel LT through the transmission portion 105 between the reflection surface 101 and the reflection surface 102. Accordingly, the light emitted from the light sources LS1, LS2, LS3a, and LS3b are combined. The light emitted from the light sources LS3a and LS3b may be combined by simply using a semi-reflection mirror.

The intensity of the light emitted from the light source LS3 in FIG. 10 and the light sources LS3a and LS3b in FIG. 11 may be smaller than the intensity of the light emitted from the light source LS1 and the light source LS2. Since the light sources LS3, LS3a, and LS3b emit the light having the wavelengths of the light sources LS3, LS3a, and LS3b, respectively, without including the wavelength converter, and emit the light having a narrower wavelength band, the light emitted from the light sources LS3, LS3a, and LS3b is combined with high efficiency. Since a low-output light source LS may be used by reducing the intensity of light emitted from the light sources LS3, LS3a, and LS3b, the light source device including the light source LS is entirely miniaturized.

Figure 12:
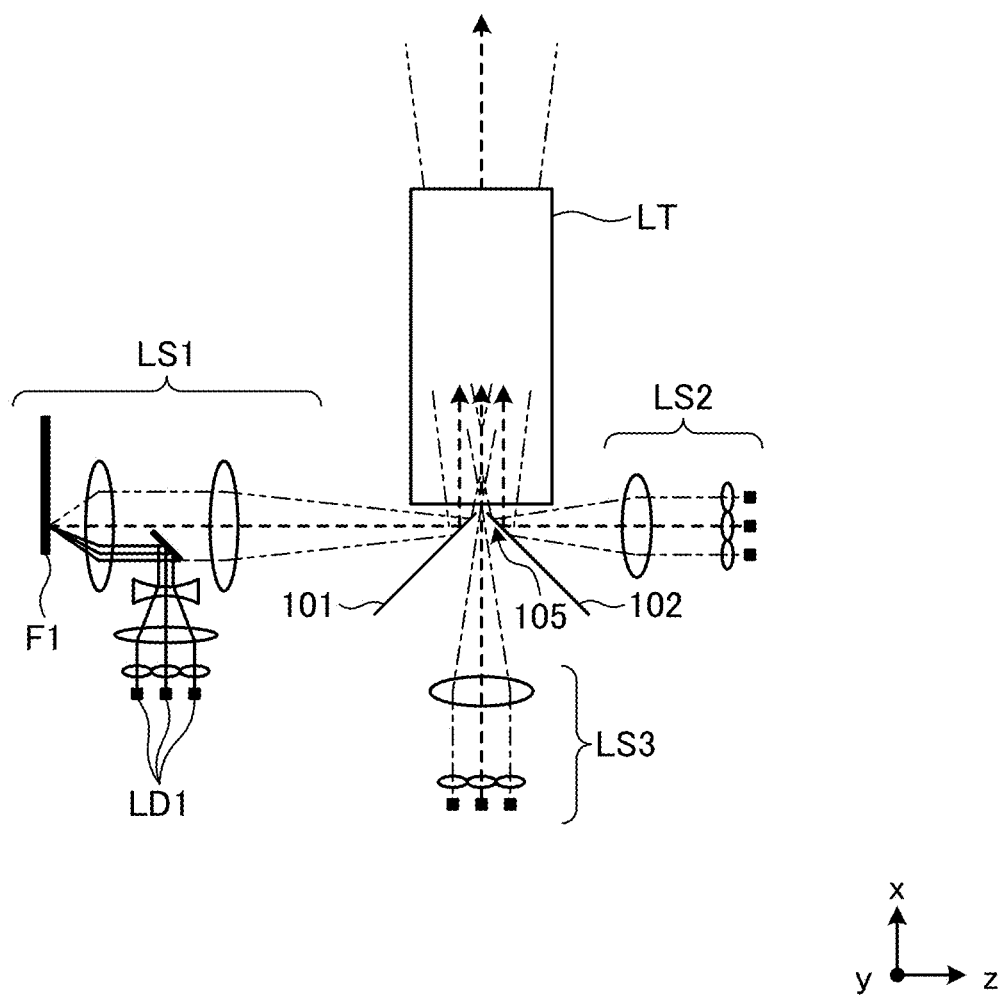
FIG. 12 is an illustration of a light source in the light guide optical device according to yet another embodiment.

FIG. 12 is an illustration of another example of the light source in the light guide optical device according to the present embodiment. In the present embodiment, at least one of the light source LS1, the light source LS2, and the light source LS3 includes the excitation light source and the wavelength-converter, and at least one of a remainder of the at least one of the light source LS1, the light source LS2, and the light source LS3 may emit light having a wavelength band narrower than the wavelength band of the excitation light source and the wavelength-converter.

In the present embodiment, the light source device illustrated in FIG. 12 may include at least one light source LS1 including the excitation light source LD1 and the wavelength-converter F1, and light sources LS2 and LS3 that emit the light having a wavelength band narrower than the wavelength bands of the light emitted from the light sources LS2 and LS3. The light source device also combines the light emitted from the three light sources LS1 to LS3 in the optical path combiner 100.

The configuration of the light source LS1 in FIG. 12 is similar to that of the light source LS1 in FIG. 9. The light sources LS2 and LS3 are light sources that emit the light having wavelength bands narrower than the wavelength band of the light emitted from the light source LS1. The light emitted from the light sources LS2 and LS3 may have the same wavelength or different wavelengths. The light sources LS2 and LS3 may include a single light emitter or an array of light emitters. The light sources LS2 and LS3 may be light sources that combine the optical paths of the light emitted from multiple light sources.

The light source LS1 emits light so as to condense the light on the reflection surface 101. The light emitted from the light source LS1 is reflected by the reflection surface 101 in the positive direction of the x-axis and enters the light tunnel LT. The light tunnel LT may be a light guide in which multiple reflection surfaces are bonded, or a glass rod that guides light using total reflection.

The light emitted from the light source LS2 is reflected by the reflection surface 102 in the positive direction of the x-axis and enters the light tunnel LT. The light emitted from the light source LS3 passes through the transmission portion 105 between the reflection surface 101 and the reflection surface 102 and directly enters the light tunnel LT. In the configuration described above, the light source device according to the present embodiment may combine the light emitted from at least one LS including the wavelength-converter F1 and the light emitted from at least two of a remainder of the light source LS. Herein, LS is a collective term of the light sources LS1, LS2, and LS3, which are interchangeable with each other.

Figure 13:
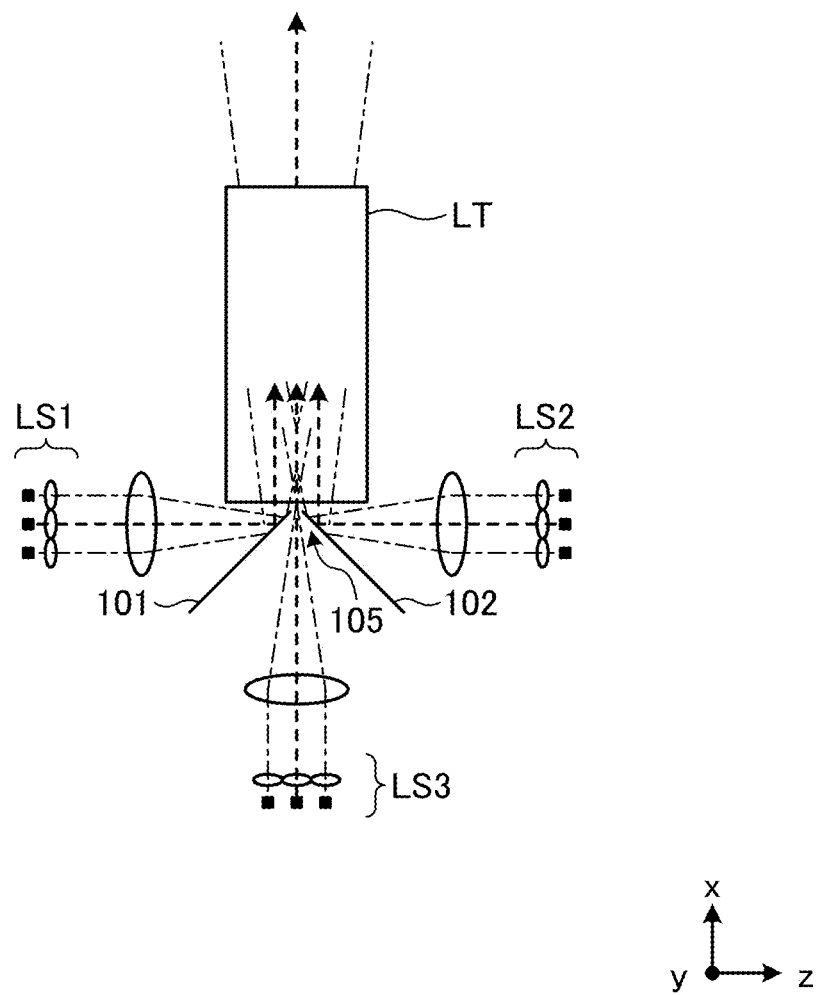
FIG. 13 is an illustration of a light source in the light guide optical device according to yet another embodiment.

FIG. 13 is an illustration of another example of the light source in the light guide optical device according to the present embodiment. In the present embodiment, as illustrated in FIG. 13, the light source device uses light sources (e.g., laser light sources) that emit light having a narrow wavelength band as the light sources LS1 to LS3. In this case, each light emitted from the light sources LS1 to LS may have the same wavelength or different wavelengths. The light sources LS1 to LS3 may be a single light-emitting element or an array of light emitter. The light sources LS1 to LS3 may be light sources that combine optical paths of light emitted from multiple light sources.

The light emitted from the light source LS1 is condensed by a condenser lens, reflected by the reflection surface 101 in the positive direction of the x-axis, and enters the light tunnel LT. The light tunnel LT may be a light guide in which multiple reflection surfaces are bonded, or a glass rod that guides light using total reflection.

The light emitted from the light source LS2 is condensed by a condenser lens, reflected by the reflection surface 102 in the positive direction of the x-axis, and enters the light tunnel LT. The light emitted from the light source LS3 is condensed by a condenser lens, passes through the transmission portion 105 between the reflection surface 101 and the reflection surface 102, and directly enters the light tunnel LT. As described above, the light source device according to the present embodiment may combine the light emitted from three light sources LS having narrow wavelength bands in the optical path combiner 100.

Figure 14:
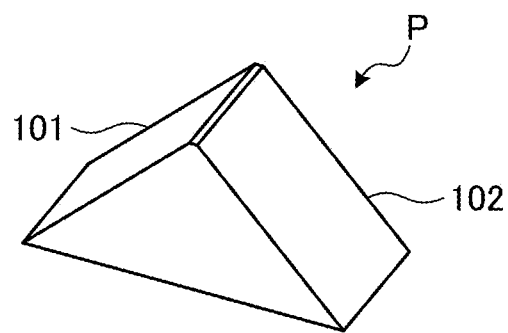
FIG. 14 is an illustration of a configuration of a prism in the light guide optical device according to one embodiment.
Figure 15:
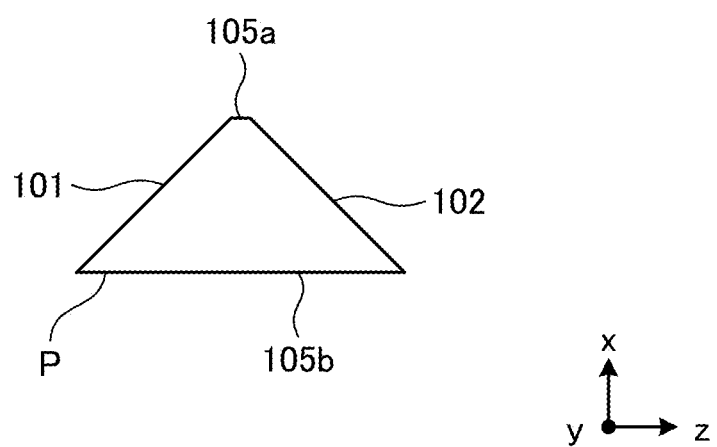
FIG. 15 is an illustration of a configuration of a prism in the light guide optical device according to another embodiment.
Figure 16:
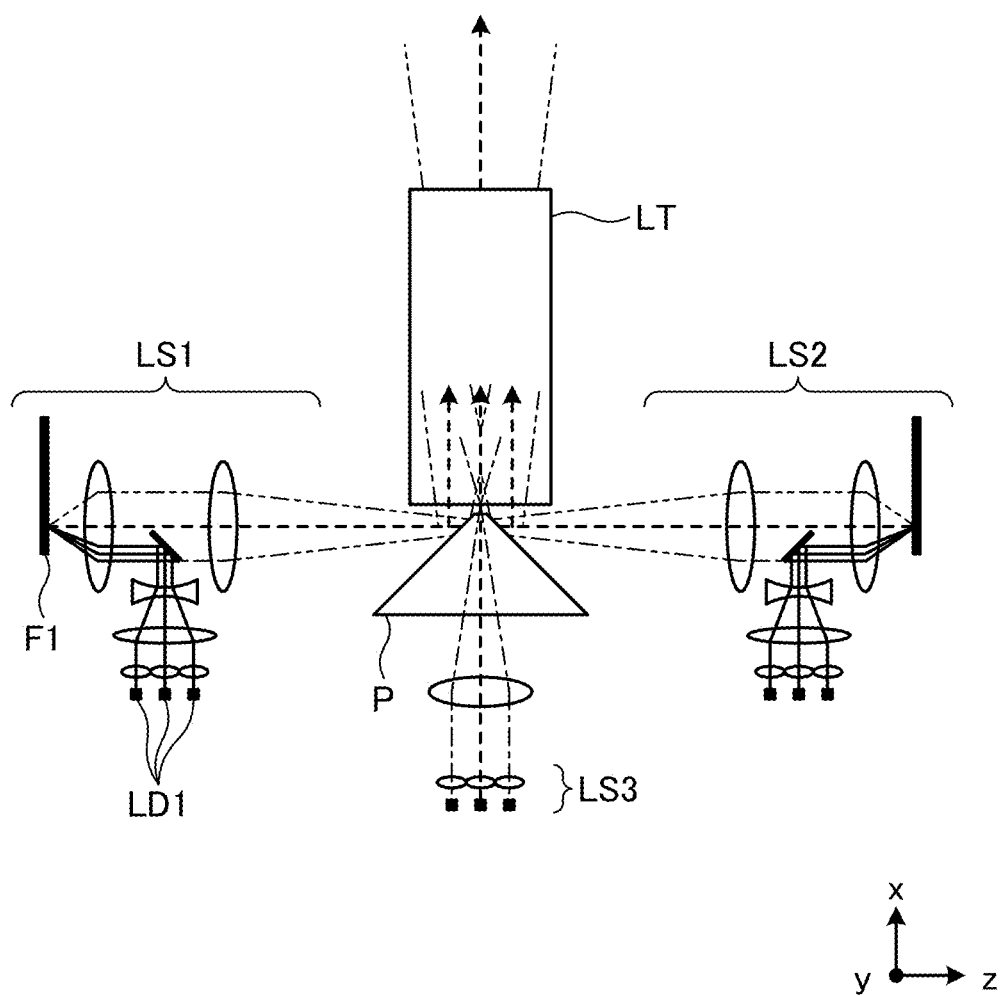
FIG. 16 is an illustration of a configuration of the light guide optical device according to one embodiment.
Figure 17:
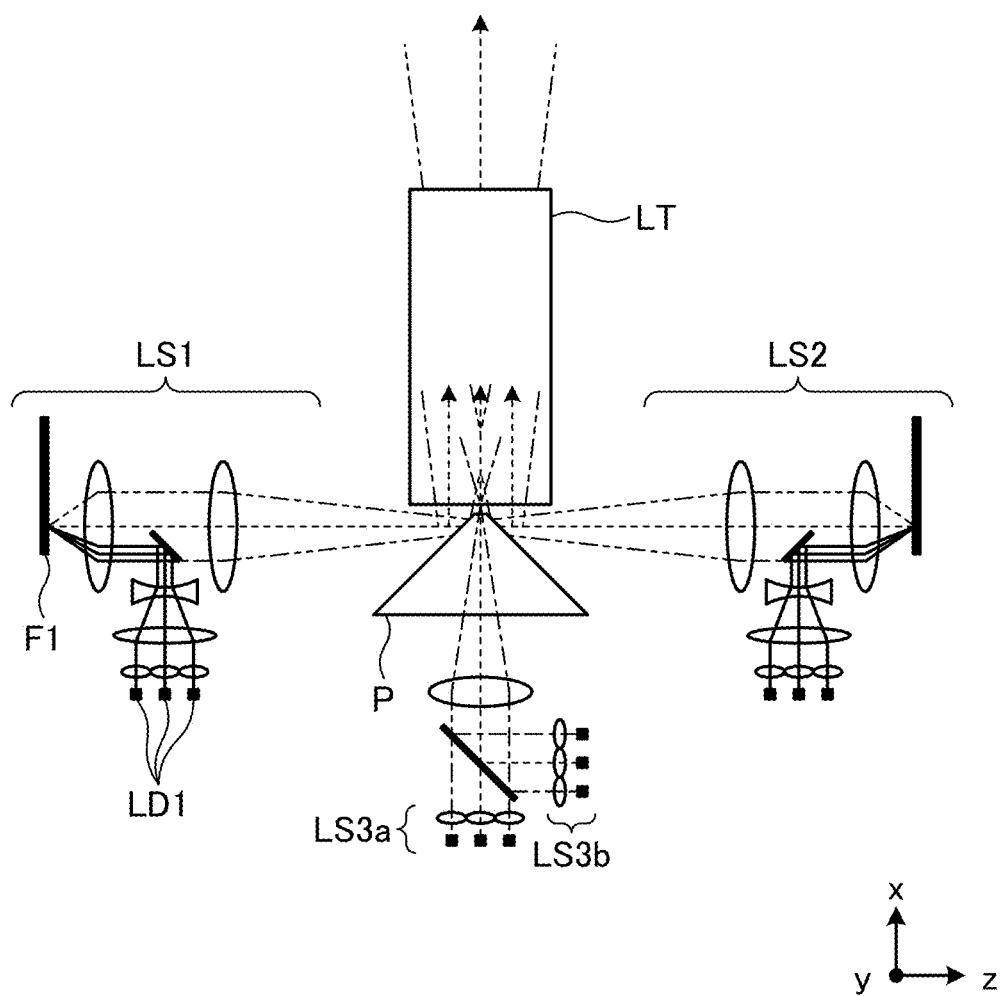
FIG. 17 is an illustration of a configuration of the light guide optical device according to another embodiment.

FIGS. 14 and 15 are illustrations of a prism included in the light guide optical device according to the present embodiment. FIGS. 16 and 17 are illustrations of the light guide optical device according to the present embodiment. In the present embodiment, the optical path combiner 100, as illustrated in FIGS. 14 and 15, may be a prism P (i.e., an optical element) having at least two reflection surfaces 101 and 102 and a transmission portion 105. Herein, as illustrated in FIGS. 14 and 15, the transmission portion 105 has a transmission surface 105a and a transmission surface 105b. In the present embodiment, the optical path combiner 100 is formed by a single prism P, but may be formed by combining multiple prisms.

In a case where the optical path combiner 100 is a single prism P, the transmission surface 105a is adjacent to each of the reflection surface 101 and the reflection surface 102 without a space. Thus, there is no portion between the transmission surface 105a and each of the reflection surfaces 101 and 102, so that light is efficiently combined. In addition, dimensional accuracy of, for example, angles or width of the reflection surface 101, the reflection surface 102, and the transmission portion 105 is improved by improving the processing accuracy of the single prism P. Since assembly of multiple components is eliminated, the optical path combiner 100 is more easily fabricated.

Even when the optical path combiner 100 is the prism P, the reflection surfaces 101 and 102 of the prism P reflects the light emitted from the light sources LS1 and LS2 in the positive direction of the x-axis and guides the light to the light tunnel LT. In addition, light emitted from the light source LS3 transmits or passes through the transmission surfaces 105a and 105b and enters the light tunnel LT. With the configuration described above, the light source device according to the present embodiment combines the optical paths of the light emitted from the three light sources LS1 to LS3 by the optical element (e.g., optical path combiner 100) including the prism P having at least two reflection surfaces 101 and 102.

Figure 18:
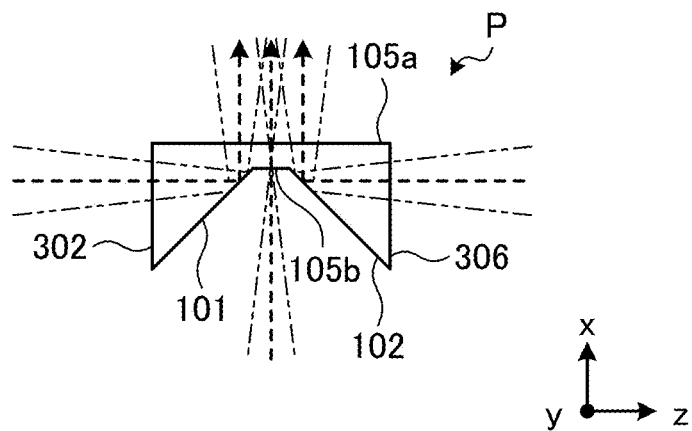
FIG. 18 is an illustration of a prism in the light guide optical device according to one embodiment.
Figure 19:
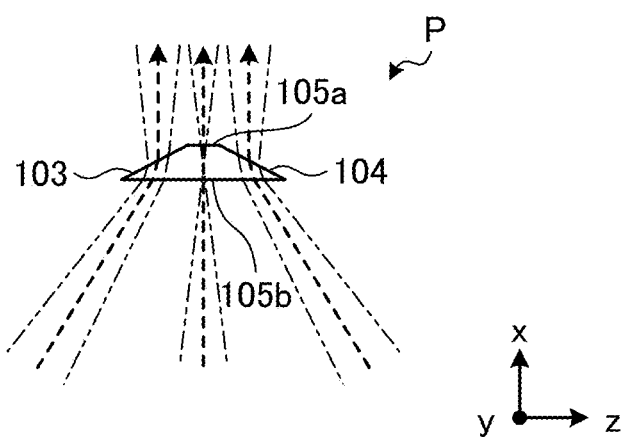
FIG. 19 is an illustration of another prism in the light guide optical device according to another embodiment.

FIGS. 18 and 19 are illustrations of other examples of a prism included in the light guide optical device according to the present embodiment. In the present embodiment, the optical path combiner 100 may be a prism P having reflecting surfaces 101 and 102 and transmission surfaces 105a, 105b, 302, and 306 as illustrated in FIG. 18. The reflection surface 101 is a reflection surface provided inside the prism P and reflects the light emitted from the light source LS1 and transmitted through the transmission surface 302 in the positive side direction the x-axis.

In a case where the optical path combiner 100 is a single prism P, the transmission surface 105a is adjacent to each of the reflection surface 101 and the reflection surface 102 without a space. Thus, there is no portion between the transmission surface 105a and each of the reflection surfaces 101 and 102, so that light is efficiently combined. In addition, dimensional accuracy of, for example, angles or widths of the reflection surface 101, the reflection surface 102, and the transmission portion 105 is improved by processing accuracy of the single prism P. Accordingly, since assembly of multiple components is eliminated, the optical path combiner 100 is fabricated more easily.

The reflection surface 102 is a reflection surface provided inside the prism P, and reflects the light emitted from the light source LS2 and transmitted through the transmission surface 306 in the positive direction of the x-axis. The transmission surfaces 105a and 105b transmit light emitted from the light source LS3 in the positive direction of the x-axis and guide the light to the light tunnel LT.

In addition, in the present embodiment, as illustrated in FIG. 19, the optical path combiner 100 is achieved by the prism P in which the reflecting surfaces 101 and 102 illustrated in FIG. 18 are replaced with refraction surfaces 103 and 104. The refraction surface 103 refracts the light emitted from the light source LS1 in the positive direction of the x-axis. The refraction surface 104 refracts the light emitted from the light source LS2 in the positive direction of the x-axis. The transmission surfaces 105a and 105b transmit light emitted from the light source LS3 in the positive direction of the x-axis and guide the light to the light tunnel LT.

In the prism P illustrated in FIGS. 18 and 19, the reflection surface or the refraction surface is used as the deflector that deflects light emitted from the light sources LS1 and LS2 in the positive direction of the x-axis. The deflector is also achieved by combining the reflection surface and the refraction surface.

Figure 20:
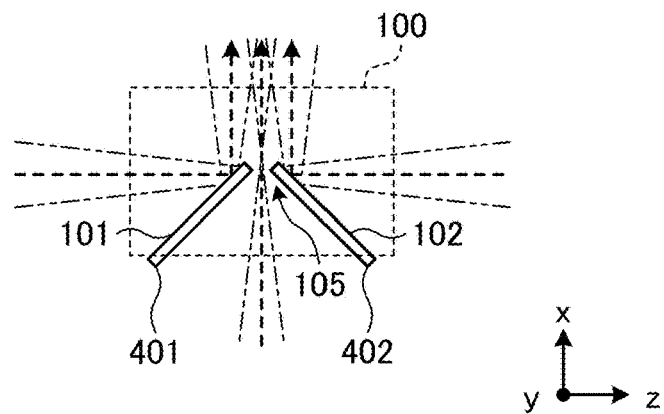
FIG. 20 is an illustration of the optical path combiner in the light guide optical device according to one embodiment.
Figure 21:
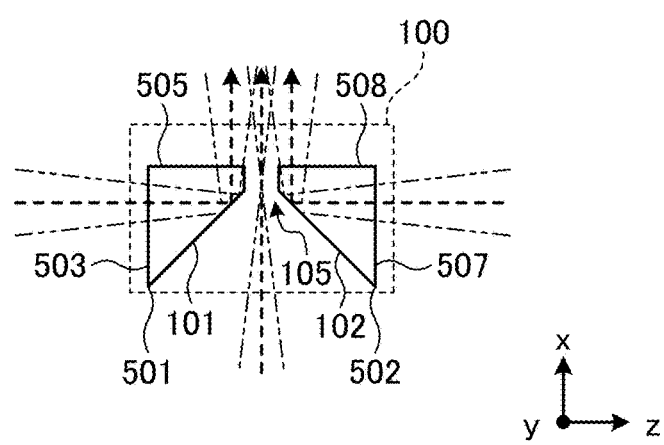
FIG. 21 is an illustration of the optical path combiner in the light guide optical device according to another embodiment.
Figure 22:
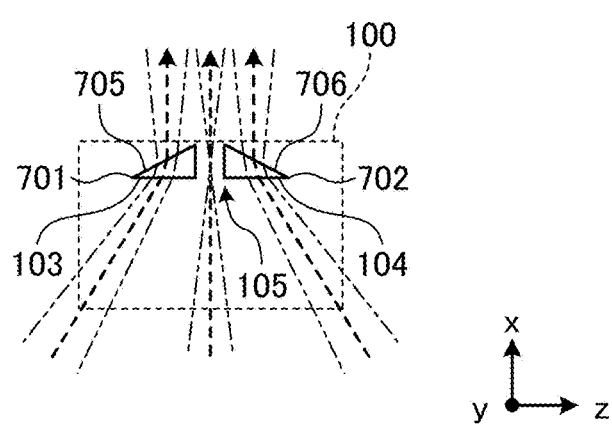
FIG. 22 is an illustration of the optical path combiner in the light guide optical device according to yet another embodiment.

FIGS. 20 to 22 are illustrations of other examples of the optical path combiner included in the light guide optical device according to the present embodiment. In the present embodiment, as illustrated in FIG. 20, the optical path combiner 100 may include an optical element 401 having a reflection surface 101 and an optical element 402 having a reflection surface 102.

Alternatively, in the present embodiment, as illustrated in FIG. 21, the optical path combiner 100 may include an optical element 501 having a reflection surface 101 and an optical element 502 having a reflection surface 102. Herein, the optical element 501 has a transmission surface 503 that transmits light emitted from the light source LS1 and a transmission surface 505 that transmits the light reflected by the reflection surface 101. The optical element 502 has a transmission surface 507 that transmits the light emitted from the light source LS2 and a transmission surface 508 that transmits the light reflected by the reflection surface 102.

Alternatively, in the present embodiment, as illustrated in FIG. 22, the optical path combiner 100 may include an optical element 701 having a refraction surface 103 and an optical element 702 having a refraction surface 104. Herein, the optical element 701 has a transmission surface 705 that transmits the light refracted by the refraction surface 103. The optical element 702 has a transmission surface 706 that transmits the light refracted by the refraction surface 104.

Figure 23:
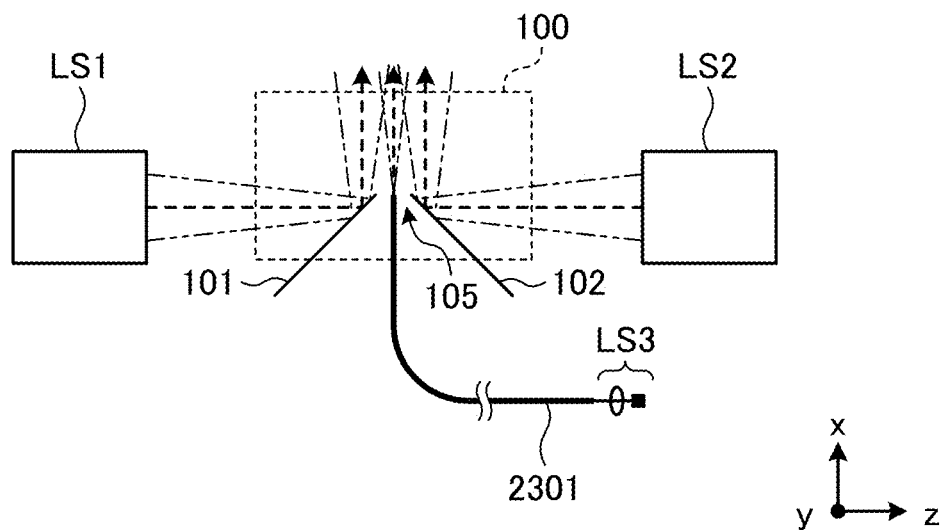
FIG. 23 is an illustration of the light guide optical device according to the present embodiment.

FIG. 23 is an illustration of another example of the light guide optical device according to the present embodiment. As illustrated in FIG. 23, the light source device according to the present embodiment may include an optical waveguide 2301 (e.g., an optical fiber) which is an example of a light guide that guides the light emitted from the light source LS3 in the positive direction of the x-axis. As illustrated in FIG. 23, the light guided by the optical waveguide 2301 is emitted in the positive direction of the x-axis so as to propagate straight between the reflection surface 101 and the reflection surface 102. As illustrated in FIGS. 20 to 23, in a case where the optical path combiner 100 is arranged by multiple optical elements, since no optical element is disposed in the transmission portion 105, the light emitted from the light source LS3 is not cut or shaded. Thus, the light emitted from the light source LS3 is combined with high efficiency.

Figure 24:
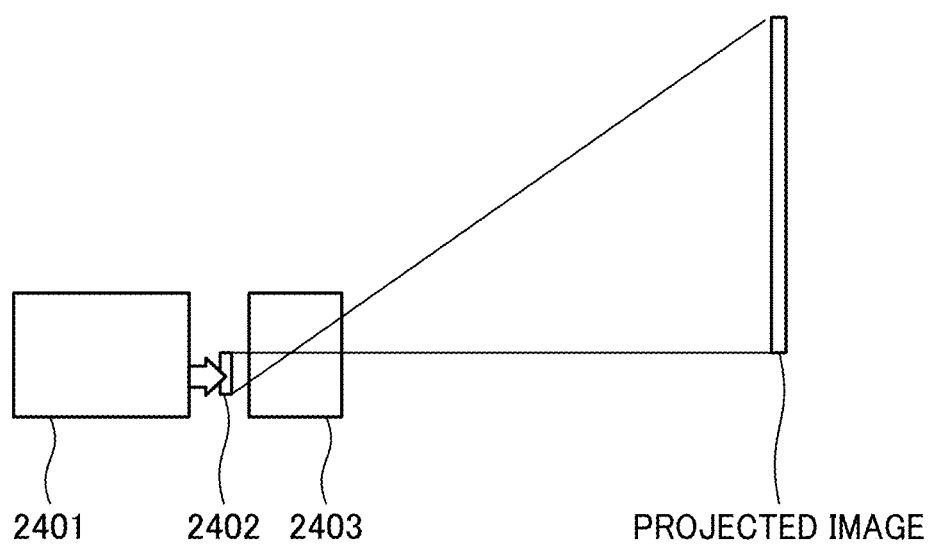
FIG. 24 is an illustration of the configuration of the image projection apparatus according to the present embodiment.

FIG. 24 is an illustration of a configuration of the image projection apparatus according to the present embodiment. The image projection apparatus according to the present embodiment is, for example, a projector, and includes an illumination optical system 2401, a light modulator 2402, and a projection optical system 2403 as illustrated in FIG. 24.

The illumination optical system 2401 is an example of an optical device including the light sources LS1 to LS2, the optical path combiner 100, and the light tunnel LT described above. The illumination optical system 2401 emits the light from the exit of the light tunnel LT to the light modulator 2402.

The light modulator 2402 is a liquid crystal device or a digital micromirror device (DMD) and emits light beams spatially modulated by the liquid crystal device or the DMD to the projection optical system 2403. The light modulator 2402 is an example of a spatial modulation element that receives light emitted from the illumination optical system 2401 and modulates the light to generate image light. The light modulator 2402 emits the image light. The projection optical system 2403 projects the image light emitted from the light modulator 2402 onto a subject such as a screen as a projection image through a projection lens. Thus, the image projection apparatus according to the present embodiment serves as a projector.

As described above, according to the light guide optical device, the light source device, and the image projection apparatus according to the present embodiment, the light loss caused by overlapping of the light-condensed portions (i.e., conjugate images) of light emitted from the light sources LS1 to LS3 in the reflection surface 101, the reflection surface 102, and the transmission portion 105 is reduced. As a result, the light from three or more light sources LS is combined with high efficiency.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A light source device, comprising:
a light guide optical device including:
an optical path combiner including:
a first deflector configured to deflect first light incident from a first direction to an emission direction;
a second deflector configured to deflect second light incident from a second direction different from the first direction, to the emission direction; and
a transmission portion between the first deflector and the second deflector, the transmission portion configured to transmit third light incident from a third direction different from each of the first direction and the second direction, in the emission direction,
wherein the optical path combiner combines the first light, the second light, and the third light, and emits the combined light to the emission direction,
the light source device further comprising:
a first light source configured to emit the first light;
a second light source configured to emit the second light; and
a third light source configured to emit the third light,
wherein the light guide optical device forms at least one of a conjugate image of the first light source, a conjugate image of the second light source, and a conjugate image of the third light source, in the optical path combiner.

2. The light source device according to claim 1, wherein:
the first deflector and the second deflector each have a reflection surface or a refraction surface.

3. The light source device according to claim 1, wherein the light guide optical device further comprises:
an optical element,
wherein the optical element includes the first deflector, the second deflector, and the transmission portion.

4. The light source device according to claim 1, wherein the light guide optical device further comprises:
an optical waveguide configured to guide the third light in the emission direction.

5. The light source device according to the claim 1,
wherein the light guide optical device forms the conjugate image of the first light source, the conjugate image of the second light source, and the conjugate image of the third light source, in the optical path combiner,
wherein the conjugate image of the first light source, the conjugate image of the second light source, and the conjugate image of the third light source are arranged in a line when viewed from the emission direction.

6. The light source device according to claim 5,
wherein the light guide optical device forms the conjugate image of the third light source between the conjugate image of the first light source and the conjugate image of the second light source.

7. The light source device according to claim 5,
wherein the conjugate image of the third light source is smaller than each of the conjugate image of the first light source and the conjugate image of the second light source.

8. The light source device according to claim 7,
wherein the third light linearly propagates along the emission direction, and an intensity of the third light is smaller than each of an intensity of the first light and an intensity of the second light.

9. The light source device according to the claim 1,
wherein at least one of the conjugate image of the first light source, the conjugate image of the second light source, and the conjugate image of the third light source has a shape elongated in one direction on an image plane.

10. The light source device according to the claim 1,
wherein at least one of the first light source, the second light source, and the third light source includes a laser light source,
wherein the laser light source includes a light emitter having a longitudinal direction that coincides with a longitudinal direction of at least one of the first deflector, the second deflector, and the transmission portion, into which light emitted from the laser light source enters.

11. The light source device according to the claim 1,
wherein the first light source, the second light source, and the third light source each include:
an excitation light source configured to emit excitation light having a wavelength band; and
a wavelength converter configured to convert the excitation light incident from the excitation light source into light having a wavelength band different form the wavelength band of the excitation light.

12. The light source device according to claim 1,
wherein at least one of the first light source, the second light source, and the third light source includes:
an excitation light source configured to emit excitation light having a wavelength band; and
a wavelength converter configured to convert the excitation light incident from the excitation light source into light having a wavelength band different from the wavelength band of the excitation light,
wherein at least one of a remainder of the at least one of the first light source, the second light source, and the third light source emits light having a wavelength band narrower than the wavelength band of the excitation light.

13. The light source device according to the claim 1, further comprising:
a light homogenizer configured to guide and emit the light emitted from the optical path combiner.

14. An image projection apparatus comprising:
an illumination optical system including the light source device according to claim 13;
a spatial light modulator configured to receive light emitted from the illumination optical system and emit image light; and
a projection optical system configured to project the image light on an object.

15. A light source device, comprising:
a light guide optical device including an optical path combiner which includes:
a first deflector;
a second deflector; and
a passage between the first deflector and the second deflector,
a first light source to emit first light;
a second light source to emit second light; and
a third light source to emit third light,
wherein:
the optical path combiner is to combine the first light, the second light, and the third light and emit combined light to an emission direction,
the first deflector is to deflect the first light incident from a first direction;
the second deflector is to deflect the second light incident from a second direction different from the first direction,
the passage is to pass therethrough the third light from a third direction to the emission direction, the third direction different from the first direction and the second direction, and
a conjugate image of at least one of the first light source, the second light source, or the third light source is to be formed in the optical path combiner.

16. The light source device according to claim 15, wherein:
the first deflector and the second deflector each have a reflection surface or a refraction surface.

17. The light source device according to claim 15,
wherein the light guide optical device further comprises:
an optical element,
wherein the optical element includes the first deflector and the second deflector.

18. The light source device according to claim 15,
wherein the light guide optical device further comprises:
an optical waveguide configured to guide the third light through the passage in the emission direction.

19. The light source device according to the claim 15, wherein:
the third direction and the emission direction are a same direction.

20. The light source device according to the claim 15, further comprising:
a light homogenizer to guide and emit the light emitted from the optical path combiner.

* * * * *